United States Patent [19]

Furui et al.

[11] Patent Number: 4,742,434
[45] Date of Patent: May 3, 1988

[54] VEHICULAR LAMP

[75] Inventors: Kazushige Furui, Shizuoka; Yoshihiro Yamai, Aichi, both of Japan

[73] Assignees: Koito Manufacturing Co., Ltd., Tokyo; Toyota Jidosha Kabushiki Kaisha, Aichi, both of Japan

[21] Appl. No.: 855,061

[22] Filed: Apr. 23, 1986

[30] Foreign Application Priority Data

Apr. 28, 1985 [JP] Japan ............................. 60-64068[U]

[51] Int. Cl.⁴ .............................................. B60Q 1/00
[52] U.S. Cl. ....................................... 362/61; 362/80; 174/52 R; 439/375
[58] Field of Search ............................ 362/61, 80, 83; 174/52 R; 339/59 L, 102 L, 125 L, 176 L, 182 L, 91 R; 439/375, 378

[56] References Cited

U.S. PATENT DOCUMENTS 3,721,939 3/1973 Paugh ................................. 339/14 R
3,860,316 1/1975 Hardesty ............................. 339/91 R

FOREIGN PATENT DOCUMENTS 1153331 3/1958 France .............................. 174/52 R Primary Examiner—Samuel Scott
Assistant Examiner—Allen J. Flanigan
Attorney, Agent, or Firm—Sughrue, Mion, Zinn, Macpeak & Seas

[57] ABSTRACT

A vehicular lamp in which the back cover is positively prevented from coming off the main body of the lamp and connectors of the lamp can be easily connected and disconnected. The lamp includes light bulb, a lamp body, and a back cover detachably engageable with the body. The back cover secures a first connector. A second connector is provided which is adapted to be connected with the first connector, and the lamp body is formed with a stop engageable with the second connector. The first and second connectors are positioned on the same side of the back cover when they are connected. When the connectors are coupled together, the side surface of one of the connectors is in surface contact with the surface of the lamp body so that angular displacement of the back cover relative to the lamp body is prevented by this surface contact, in addition to the interlocking of the connectors.

8 Claims, 2 Drawing Sheets

VEHICULAR LAMP

BACKGROUND OF THE INVENTION

The present invention relates to a vehicular lamp, and particularly to such lamp in which a back cover is fitted to a lamp body. The improvement of the invention relates to more specifically to such a lamp in which the back cover is prevented from falling off the lamp body and connectors fixed to the lamp body and the back cover are easily connectable with each other.

FIG. 1 is a cross-sectional view of a conventional vehicular lamp including a lamp body 2 and a lens 8 provided on the front side of the lamp body. A hook 18 is provided on the upper rear side of the lamp body 2, and a protruding wall 2-1 is formed on the lower rear side thereof. A back cover 3 has a U-shaped bend on its upper side where a hook 28 is formed. The back cover 3 also includes an L-shaped, downwardly adjoining portion at its lower side. The L-shaped portion is engaged with the protruding wall 2-1, and the hook 18 is snap-fitted with the hook 28. As a result, the hooks 18 and 28 define latch means, and a lamp 20 is positioned within a lamp housing defined by the lamp body 2, back cover 3, and the lens 8.

The construction of such conventional vehicular lamp is advantageous in that the back cover 3 is readily detachable from the lamp body 2. However, the latch portions may become disengaged from each other due to vibration of the vehicle during travel, deformation of the lamp body and/or the back cover during use, replacement of the lamp, etc., since the upper portions of the lamp body and the back cover are engaged with each other only by the latch portions. As a result, the back cover 3 may become disengaged from the lamp body 2, as shown by a broken line 3' in FIG. 1, and the back cover may then drop down rearwardly. In such a case, if the lamp is in the operative state, because the lamp may in direct contact with other elements in the trunk of the vehicle, there is a fire hazard.

SUMMARY OF THE INVENTION

It is therefore an object of the invention to obviate the above mentioned drawbacks and to provide an improved vehicular lamp structure.

Another object of the invention is to provide a lamp structure having an improved ease of assembly and disassembly of the back cover relative to the lamp body, yet which is capable of preventing accidental removal of the back cover from the lamp body.

These and other objects of the present invention are attained by making use of a side surface of a connector in surface contact with the surface of the back cover and the lamp body. One of the connectors is provided with stop means to engage locking means of the back cover, securing therein another connector to be connected with the one of the connectors. Upon assembly of the connectors, the side surface of the one of the connectors is in surface contact with the surface of the lamp body so that angular displacement of the back cover relative to the lamp body is prevented by the surface contact in addition to the mutual coupling of the connectors.

DESCRIPTION OF THE PREFERRED EMBODIMENT

Figure 1:
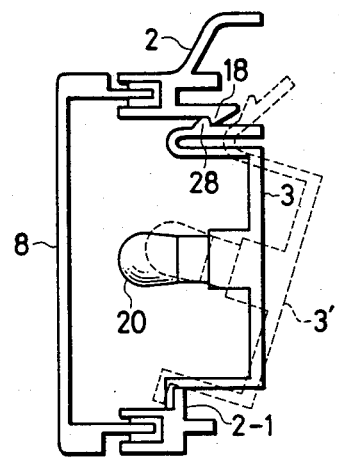
FIG. 1 is a cross-sectional view showing a conventional vehicular lamp structure.
Figure 2:
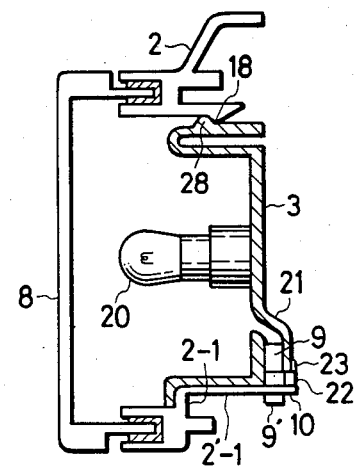
FIG. 2 is a cross-sectional view showing a first embodiment of the present invention.
Figure 3A:
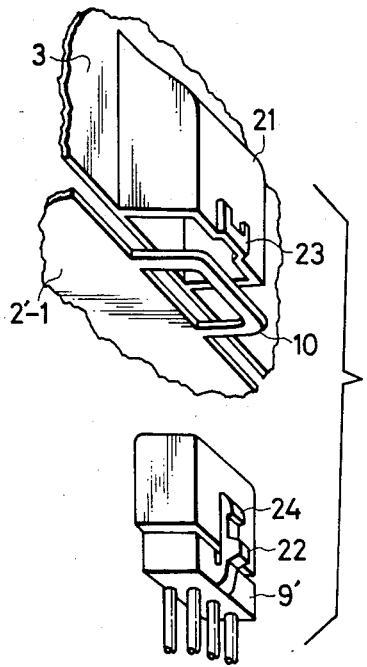
FIG. 3A is a perspective view showing the first embodiment before assembly.

A first embodiment of the present invention will be described with reference to FIGS. 2 and 3A,3B, wherein like parts and components are designated by the same reference numerals as those shown in FIG. 1.

According to the first embodiment, an extension wall 2'-1 extends from the top of a protruding wall 2-1 to form an L-shaped wall in combination. At the rear portion of the extension wall 2'-1, a holding segment or loop 10 is provided with a hole which allows one of the connectors 9' to pass therethrough and which fixes the connector 9'. The holding segment 10 is a flexible structure, bendable in the vertical direction as shown in FIG. 3B. A container 21 is provided at the lower portion of the back cover 3 which bulges rearwardly to accommodate therein another connector 9, as shown in FIGS. 2 and 3A. At the lower portion of the container 21, a locking piece 23 is provided.

Further, in this embodiment, a stop member 22 is provided integrally with the connector 9'. The stop member 22 projects from the trailing edge of the connector 9' and extends toward the front end thereof parallel thereto. The tip end portion of the stop member 22 is provided with an engagement claw 24 adapted to be inserted into the locking piece 23 of the container 21 upon assembly.

With this structure, the connector 9' is brought into engagement with the connector 9 housed in the container 21. In this case, the engagement claw 24 engages the locking piece 23, and the stop member 22 is surrounded by the flexible holding segment 10 extending from the extension wall 2'-1. As a result, angular displacement of the back cover 3 relative to the lamp body 2 is prevented by the engagement between the connectors as well as the surface contact between the connector 9' and back cover and the holding segment.

Figure 3B:
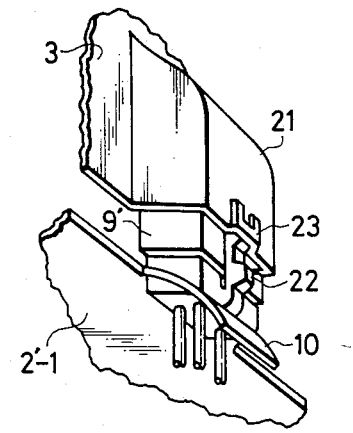
FIG. 3B is a perspective view showing the first embodiment when one of the connectors has been removed.

To remove the connector 9' from the connector 9, the holding segment 10 is pressed downwardly as shown in FIG. 3B to bend the same so that engagement between the stop member 22 and the holding segment 10 is released. Then, the stop member 22 is pressed toward the connector body so that the engagement claw 24 is disengaged from the locking piece 23.

According to the first embodiment, the holding segment 10 is easily deformed for removal of the connector 9', and the pressing operation of the stop member 22 can be easily performed. Further, the connector surface also serves to prevent the back cover from being angularly displaced from the lamp body, thereby avoiding accidental removal of the back cover from the lamp body.

Figure 4:
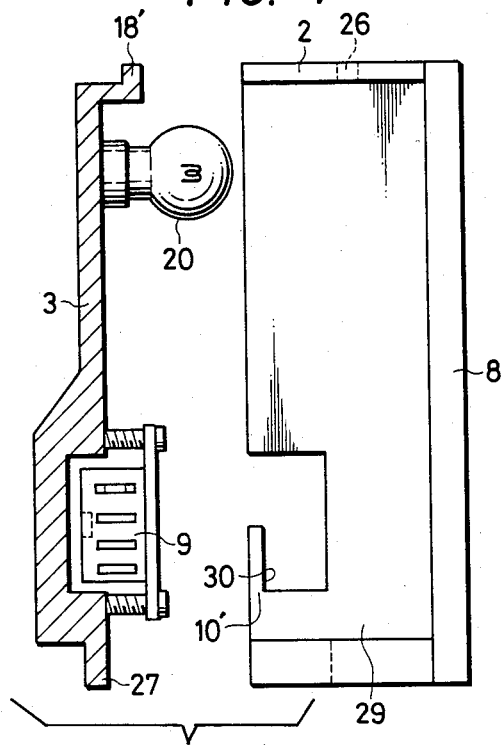
FIG. 4 is a cross-sectional view showing a second embodiment of the present invention.
Figure 5:
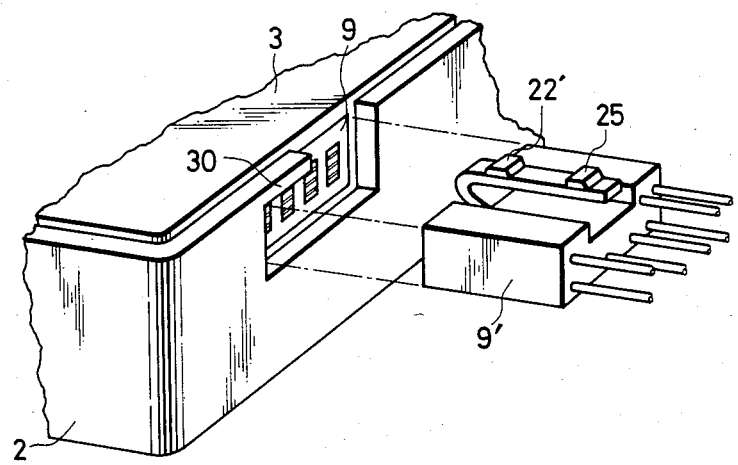
FIG. 5 is a perspective view showing the second embodiment of the present invention.

A second embodiment of the present invention will be described with reference to FIGS. 4 and 5. In this embodiment, a connector 9 is fixedly secured to a back cover 3, as shown in FIG. 4. The back cover 3 is provided with a locking projection 18' adapted to be engaged with a hole 26 formed in a lamp body 2. The lamp body 2 is provided with a side wall 29 in which a recess or hole 30 is formed at a position corresponding to the connector 9. The hole or recess 30 is adapted to permit the connector 9 or 9' to pass therethrough. An edge wall 10' is provided adjacent the recess which functions as a stop in contact with the side surface of the connector 9'. The connector 9' has a leading edge from which a stop member 22' protrudes. The stop member extends toward the rear end of the connector 9' parallel thereto. The stop member 22' engages a hole (not shown) in the connector 9 upon depressing a finger support 25. Upon coupling of the connectors 9 and 9', the side surface of the connector 9' is in surface contact with the inner edge surface of the lamp body and edge wall 10'. As a result, stabilized coupling is obtained between the lamp body 3 and the back cover 2.

The edge wall 10' can be extended to provide a hole for allowing insertion of the connector 9'. Alternatively, the edge wall 10' can be made to extend to provide an L-shaped cross section as shown in FIG. 5. In this embodiment, it is unnecessary to provide members corresponding to the engagement claw 24 and locking piece 23 shown in the first embodiment. The side surface of the connector 9' serves to prevent the back cover from angular displacement relative to the lamp body 2 because of the coupling of the connectors 9 and 9', as does the surface contact between the connector 9' and the lamp body 2. As a result, accidental dislodging of the back cover from the lamp body is avoided.

We claim:

1. A vehicular lamp assembly comprising:
    a bulb (20);
    a lamp body (2) of open and box shape and formed with stop means (10, 10');
    a back cover (3) detachably engaged with said lamp body (2), said back cover (3) including means securing said bulb (20) to said back cover;
    a first connector 9 secured to one edge portion of said back cover (3) for applying an electrical current to said bulb 20;
    a second connector (9') electrically connected with said first connector (9) and engaging said stop means (10, 10') of said lamp body (2), said second connector (9') having locking means (24, 22') engaging said back cover; and interengageable latch means (18, 28, 18', 26) positioned on said back cover at an edge thereof opposite said one edge portion securing said first connector and engaging said back cover to said lamp body remote from said first and second connectors; said first and second connectors being positioned at the same side of said back cover upon connection therebetween, whereby said back cover is securely engaged with said lamp body by said second connector being brought into connection with said first connector and said second connector is releasably secured to said back cover.

2. The vehicular lamp as claimed in claim 1, wherein said latch means is positioned at an upper end portion of said lamp body and said stop means is positioned at a lower rear end portion of said lamp body.

3. The vehicular lamp as claimed in claim 2, wherein said back cover comprises a container provided at a rear surface thereof for accommodating said first connector therein, said container having a locking piece, and said locking means of said second connector projecting from a trailing end thereof and extending toward a front end of said second connector substantially parallel to said second connector and engaging said container locking piece.

4. the vehicular lamp as claimed in claim 3, wherein said locking means comprises an engagement claw at a leading end portion, and a stop member positioned behind said engagement claw, said stop member being engageable with said stop means of said lamp body, and said engagement claw detachably engaging said locking piece.

5. The vehicular lamp as claimed in claim 4, wherein said stop means extends from a side wall of said lamp body, said stop means having a U-shape defining a hole receiving said second connector and being bendable at a fulcrum point thereof to effect disengagement from said stop member.

6. The vehicular lamp as claimed in claim 1, wherein said first connector is fixed to an inner surface of said back cover, and said locking means of said second connector projects from a leading edge thereof and extends toward a rear end thereof parallel to said second connector.

7. The vehicular lamp as claimed in claim 6, wherein said locking means comprises an engagement claw positioned at rear portion thereof, and said first connector is formed with a locking piece engageable with said engagement claw.

8. The vehicular lamp as claimed in claim 6, wherein said lamp body is formed with a recessed portion at its side wall to allow insertion of said second connector, and said stop means extends from said lamp body and is positioned at an open end of said recessed portion.

* * * * *